(12) United States Patent
Aizpuru

(10) Patent No.: US 7,643,756 B2
(45) Date of Patent: Jan. 5, 2010

(54) OPTICAL NETWORK FOR TRANSFERRING DATA BETWEEN DEVICES IN A VEHICLE

(75) Inventor: Jose Joaquin Aizpuru, Murphy, TX (US)

(73) Assignee: Finisar Corporation, Sunnyvale, CA (US)

( * ) Notice: Subject to any disclaimer, the term of this patent is extended or adjusted under 35 U.S.C. 154(b) by 506 days.

(21) Appl. No.: 11/102,290

(22) Filed: Apr. 8, 2005

(65) Prior Publication Data

US 2006/0067697 A1 Mar. 30, 2006

Related U.S. Application Data

(60) Provisional application No. 60/613,788, filed on Sep. 28, 2004.

(51) Int. Cl.
*H04B 10/00* (2006.01)
*H04J 14/02* (2006.01)

(52) U.S. Cl. ............... 398/166; 398/82; 398/135

(58) Field of Classification Search ............ 398/82, 398/83, 89, 107, 113, 135, 138, 141, 165, 398/166, 167
See application file for complete search history.

(56) References Cited

U.S. PATENT DOCUMENTS

| | | | | |
|---|---|---|---|---|
| 5,289,302 | A * | 2/1994 | Eda | 398/51 |
| 5,796,501 | A * | 8/1998 | Sotom et al. | 398/59 |
| 6,753,520 | B2 * | 6/2004 | Spirin et al. | 250/227.16 |
| 7,010,233 | B2 * | 3/2006 | Lindblad | 398/164 |
| 7,147,387 | B2 * | 12/2006 | Aronson et al. | 385/92 |
| 7,215,891 | B1 * | 5/2007 | Chiang et al. | 398/137 |
| 2001/0025376 | A1 * | 9/2001 | Knobl | 725/74 |
| 2003/0213895 | A1 * | 11/2003 | Duer | 250/227.31 |
| 2004/0267951 | A1 * | 12/2004 | Hattori | 709/231 |
| 2005/0058000 | A1 * | 3/2005 | Jurzitza et al. | 365/226 |
| 2006/0200585 | A1 * | 9/2006 | Weigert | 709/249 |
| 2007/0259441 | A1 * | 11/2007 | Saaski | 436/164 |

OTHER PUBLICATIONS

Most Corporation, (2005) *available at* http://www.mostcooperation.com/index.php.
Von Dr. Christian Thiel, "Optical Data Transmission Over MOST," Elektronik Automotive, Dec. 2002, *available at* http://www.oasis.de/files/pressreleases/2002Dec_ElektronikAutomotive_en.pdf.
Paul Polishuk, "Plastic Optical Fibers and 1394 The Impact on the Wiring Harness Industry," Wiring Harness News, Sep./Oct. 2001, *available at* http://www.wiringharnessnews.com/Articles/2001/Plasti_1/Plastic_Optical.pdf.

(Continued)

*Primary Examiner*—Dalzid Singh
(74) *Attorney, Agent, or Firm*—Workman Nydegger

(57) ABSTRACT

Transceivers, networks, and methods for providing data communication to electrical devices in a vehicle, and a vehicle comprising the transceiver and network. A transceiver of the network can include a receive optical subassembly including an opto-electronic transducer configured to receive a first incoming optical signal from an optical fiber having a silica based core. Signal extraction circuitry is configured to extract data intended for an electrical device from of the incoming optical signal and provide the extracted data to the electrical device, and a transmit optical subassembly comprising a laser, such as a VCSEL, configured to transmit an outgoing optical signal to a second optical fiber having a silica based core.

18 Claims, 5 Drawing Sheets

OTHER PUBLICATIONS

Leroy Davis, "MOST Bus Description," Automotive Buses, (2005) *available at* http://www.interfacebus.com/Design_Connector_Automotive.html.

Infineon Technologies, (2004), *available at* http://www.infineon.com/cgi/ecrm.dll/ecrm/scripts/prod_ov.jsp?oid=45647&cat_oid=-10882.

Lambkin, et al., "Advanced Emitters for Plastic Optical Fibre," ICPOF, 2002, *available at* http://www.firecomms.com/docs/whitepapers/lambkin.pdf.

Infineon Technologies, (2003), *available at* http://www.infineon.com/cmc_upload/documents/090/981/Most_POF.pdf.

* cited by examiner

OPTICAL NETWORK FOR TRANSFERRING DATA BETWEEN DEVICES IN A VEHICLE

CROSS-REFERENCE TO RELATED APPLICATIONS

This application claims the benefit of U.S. Provisional Application No. 60/613,788 entitled "Optical Network for Transferring Data Between Devices in a Vehicle" filed Sep. 28, 2004, the contents of which is hereby incorporated by reference.

BACKGROUND OF THE INVENTION

1. The Field of the Invention

The present invention relates generally to fiber optic communication systems. More specifically, the present invention is related to fiber optic data transfer between electronic devices in a vehicle.

2. Related Technology

Vehicles today include a variety of electronic devices that may need to communicate and interact with other electronic devices, a human user, or even outside communication systems, such as radio wave, cellular, and satellite communication systems. While this is true for almost every type of vehicle, such as airplanes, trains, boats, helicopters, motorcycles, automobiles, and other vehicles, this is particularly true for automobiles.

Automobiles today may include, for example, security systems that interact with global positioning systems (GPS), which in turn may communicate with electronic video displays and navigation systems. Automobiles may also have entertainment devices that may include, for example, compact disk (CD) players, cd-rom readers, digital video disk (DVD) players, and other analog and digital medium reading devices that may be coupled to audio amplifiers, video displays, as well as other multi-media output, imput, and interactive components. Automobiles may also include diagnostic systems, including various sensors that provide information regarding the operation and performance of the automobile. These diagnostic systems may also need to communicate with other components, such a display or control system.

The number of electronic devices in automobiles today may also create a dangerous environment by causing the driver to be distracted from operation of the automobile. Driver safety may in some instances be promoted by communication between the electrical devices in the vehicle. For example, safety may be promoted by communication between an integrated cellular phone and the entertainment devices such that when an incoming call is received, the volume of the entertainment devices is muted such that the driver may receive the cellular communication without being overly distracted from operating the automobile. In addition, a car security system may communicate with a cellular or satellite system to notify the owner, or a third party, of a theft or accident.

Some automobile manufacturers have begun to bring vehicles to market with fiber optic networks allowing certain electronic devices to interact. To communicate over a network using fiber optic technology, fiber optic components such as a fiber optic transceiver are used to send and receive optical data. Generally, a fiber optic transceiver can include one or more optical subassemblies ("OSA") such as a transmit optical subassembly ("TOSA") for sending optical signals, and a receive optical subassembly ("ROSA") for receiving optical signals. More particularly, the TOSA receives an electrical data signal and converts the electrical data signal into an optical data signal for transmission onto an optical network. The ROSA receives an optical data signal from the optical network and converts the received optical data signal to an electrical data signal for further use and/or processing. Both the ROSA and the TOSA include specific optical components for performing such functions.

Most, if not all, fiber optic networks implemented in vehicles use LED-based transmitter and receiver technology optically coupled with plastic optical fiber having a diameter of about one millimeter. Using these components in a fiber optic network, however, suffers from several performance, and reliability problems. For example, these networks are typically only operable in the temperature range of negative 40 degrees Celsius to positive 85 degrees Celsius. It may be desirable, however, to place components of the network in the roof of the automobile or near the engine, where more extreme temperatures are common. In this case, the networks used today may exhibit communication transmission problems or even failure.

In addition, plastic optical fiber of 1 millimeter thickness suffers from the limitation that it has a relatively large functional bending radius ($r_{min}$=5 cm). Plastic optical fiber's larger bending radius can create problems in automobiles where the space allowed for running the plastic optical fiber may be limited without substantially altering the design of the automobile.

Plastic optical fiber also suffers from the limitation that it is easily damaged or deformed. For example, plastic optical fiber may be damaged by various forces placed on the fiber during automobile production. This damage may result in light transmission failure or increased light attenuation.

Plastic optical fiber of 1 millimeter thickness and LEDs are also limited in their ability to transfer large amounts of data across relatively long distances of cable using highly modulated light. More specifically, using 1 millimeter plastic fiber and LEDs for transmission can limit the transmission to only certain spectrums, to a distance of transmission of about 50 meters, and limits the rate of data transfer to about 50 Mbit/s.

Therefore, it would be advantageous to implement a fiber optic network in a communication system between electronic devices used in a vehicle that is less susceptible to potentially damaging environmental and production conditions, and allows for higher transmission rates of data among the various electronic devices in a vehicle.

BRIEF SUMMARY OF THE INVENTION

Transceivers, networks, and methods for providing data communication to electrical devices in a vehicle. A transceiver for transmitting data to an electronic device coupled to the transceiver is described. The electronic device is an electrical device in a vehicle. The transceiver can include a receive optical subassembly comprising an opto-electronic transducer configured to receive an incoming optical signal from first optical fiber having a silica based core. The transceiver can include signal extraction circuitry configured to identify data intended for the electrical device coupled to the transceiver from the incoming optical signal and transmit the data that is intended for the electrical device to the electrical device located within the vehicle. The transceiver can include a transmit optical subassembly comprising a vertical cavity surface emitting laser (VCSEL) configured to transmit an outgoing optical signal to a second optical fiber having a silica based core.

A fiber optic network for providing data communication between electronic devices in a vehicle is described. The network can include a first optical fiber having a silica based core for conducting an optical signal. A first transceiver for transmitting data to a first electronic device can include a receive optical subassembly comprising an opto-electronic transducer optically coupled to the first optical fiber to receive the optical signal, signal extraction circuitry configured to receive the optical signal and extract a first data packet intended for the first electronic device from the optical signal, and a transmit optical subassembly comprising a vertical cavity surface emitting laser (VCSEL) configured to transmit at least a portion of the optical signal to a second optical fiber.

A method for transferring data between electronic devices coupled to a network within a vehicle is described. The network can include a plurality of transceivers coupled to the electronic devices. The method can include receiving within a first transceiver coupled to a first electronic device an optical signal from an optical fiber having a silica based core, identifying data intended for the first electronic device, transmitting the data intended for the first electronic device to the first electronic device, and transmitting data not intended for the first electronic device to a second optical fiber having a silica based core.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention are not therefore to be considered to be limiting of its scope, the invention will be described and explained with additional specificity and detail through the use of the accompanying drawings in which.

DETAILED DESCRIPTION OF THE INVENTION

The invention is described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention.

Figure 1:
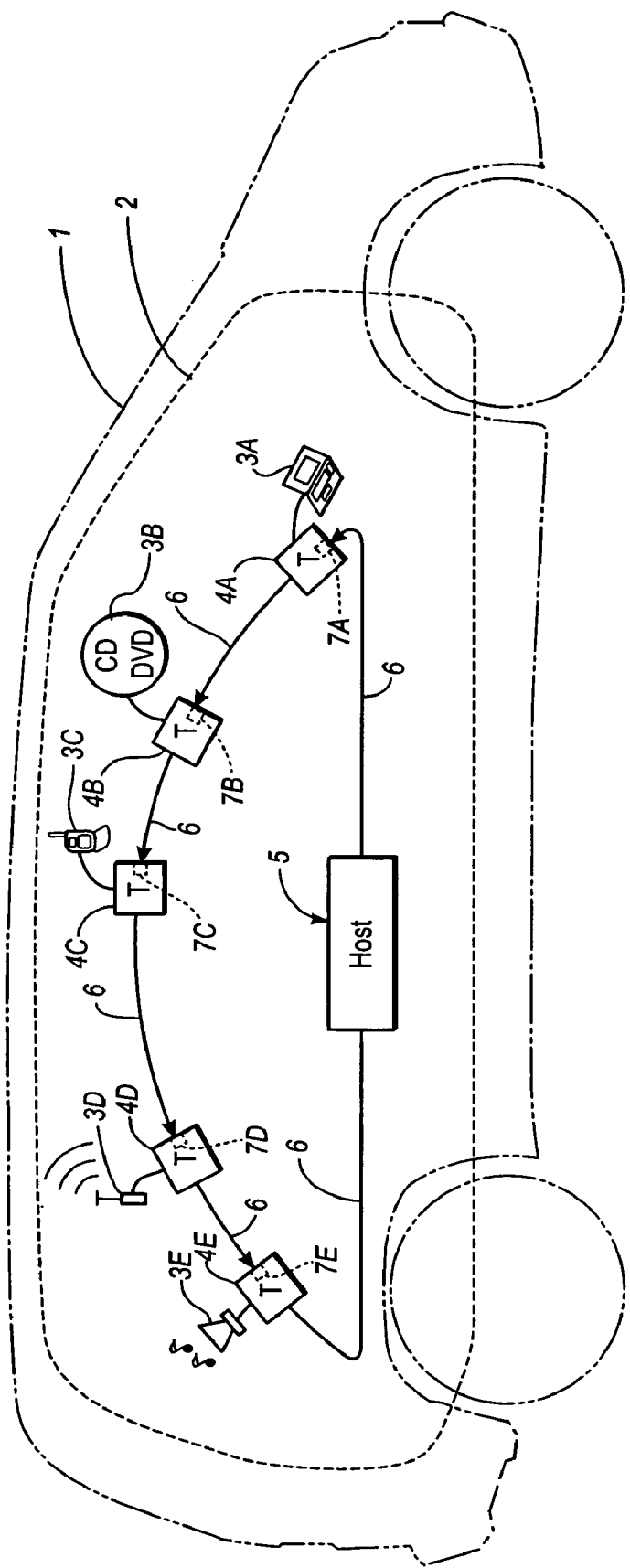
FIG. 1 illustrates an automobile containing a fiber optic network for connecting various electronic devices within the automobile according to an embodiment of the present invention.

FIG. 1 illustrates an automobile 1 containing a fiber optic network 2 for connecting various electronic devices 3A through 3E (hereinafter "3" when referred to as a group) within the automobile 1 according to an example embodiment of the present invention. As shown in FIG. 1, the automobile 1 may include several electronic devices 3 such as a personal computer 3A, a compact disk CD and DVD player 3B, a cellular phone 3C, a GPS system 3D, and an audio amplification speaker system 3E. Each of the electronic devices 3 is coupled to the fiber optic network 2 by a corresponding fiber optic transceiver 4A through 4E (hereinafter "4" when referred to as a group) that provides data communication between the electronic devices 3 and the fiber optic network 2. While each of the fiber optic devices 3 may be configured to communicate directly with other fiber optic devices 3, the fiber optic network 2 may further include a host system 5 for providing additional control over the transmission of data across the fiber optic network 2.

The fiber optic network may be arranged in a single loop configuration as shown in FIG. 1, where each of the transceivers 4 are arranged in series coupled by optical communication fibers 6 having a silica based core, such as Polymer Clad Silica (PCS) fibers. PCS fibers have a relatively small functional bending radius and are relatively easy to accommodate into the body of a vehicle.

Referring still to FIG. 1, each transceiver 4 can include signal extraction circuitry 7A through 7E (hereinafter "7" when referred to as a group) configured to extract data intended for the electronic devices 3 coupled the fiber optic network 2 by the transceivers 4. For example, as shown in FIG. 1, signal extraction circuitry 7A of transceiver 4A extracts data intended for personal computer 3A. Likewise, signal extraction circuitry 7B of transceiver 4B extracts data intended for the CD and DVD player 3B, signal extraction circuitry 7C of transceiver 4C extracts data intended for the cellular phone 3C, signal extraction circuitry 7D of transceiver 4D extracts data intended for the GPS system 3D, and signal extraction circuitry 7E of transceiver 4E extracts data meant for the audio amplification speaker system 3E.

According to an embodiment of the present invention, the data can be transmitted along with identification tags or other types of embedded indicators that indicate to the data extraction circuitry 7 which device the data is intended for. For example, the data intended for a particular electronic device 3 can be transmitted in packets of data and each packet can contain information, such as a data field, a data frame, or other portion of a data packet that indicates the particular electronic device 3 that the data is intended for. Upon receiving a packet of data, the data extraction circuitry 7 of each transceiver 4 examines the packet and decides whether the packet of data is intended for the particular electronic device 3 coupled to it. Upon receiving a packet of data intended for the electronic device 3 coupled to it, the transceiver 4 transmits the packet of data to the electronic device 3 coupled to it. Otherwise, the transceiver 4 retransmits the packet of data, or allows the packet to travel through, to the next transceiver 4 in the optical communication network 2 loop.

For example, upon receiving a packet of data, data extraction circuitry 7A of transceiver 4A, which connects the personal computer 3A to the fiber optic network 2, examines the packet of data to determine whether it was intended for the personal computer 3A. If the packet of data is intended for the personal computer 3A transceiver 4A transmits the packet of data to the personal computer 3A. If the packet of data is not meant for the personal computer 3A, the transceiver 4A retransmits the packet of data to the transceiver, in this case transceiver 4B, in the optical network 2.

Figure 2:
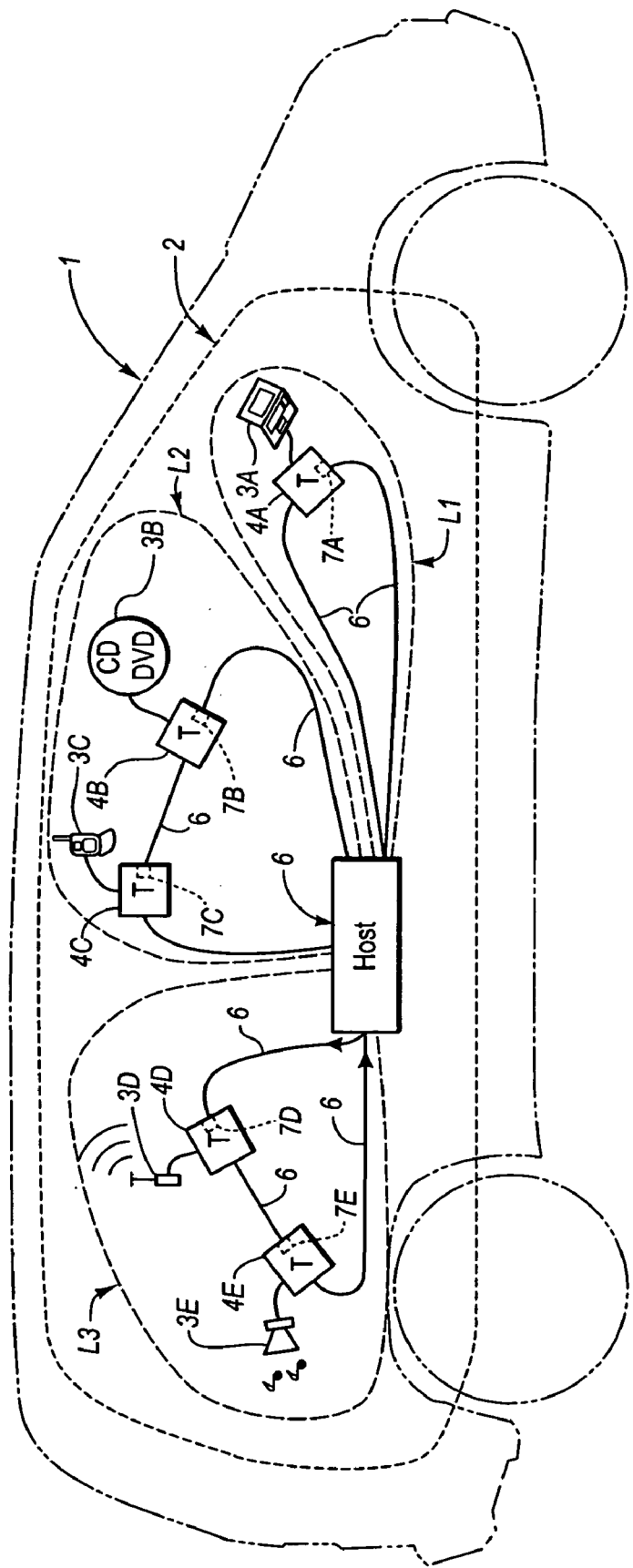
FIG. 2 illustrates an automobile containing a fiber optic network for connecting various electronic devices within the automobile according to an embodiment of the present invention.

Referring now to FIG. 2, a fiber optic network 2 for connecting various electronic devices 3 within an automobile 1 is shown according to another example embodiment of the present invention. According to the embodiment shown in FIG. 2, electronic devices 3 are coupled by transceivers 4 to the fiber optic network 2 across several fiber optic communication loops L1, L2, and L3. Several electronic devices 3 may be coupled in series by transceivers 4 along a single fiber optic communication loop (e.g. loop L2 and L3), or a single electronic device 3 may be coupled by a transceiver to a single fiber optic communication loop (e.g. loop L1).

The present invention may comprise any number of loops or arrangements of components within each loop as would be advantageous, or known to one of ordinary skill in the art. For example, as shown in FIG. 2, only signal extraction circuitry 7A of transceiver 4A extracts data meant for personal computer 3A from its optical communication loop L1. Whereas, both signal extraction circuitry 7B of transceiver 4B and signal extraction circuitry 7C of transceiver 4C extract data from the same optical communication loop L2 for the CD and DVD player 3B and the cellular phone 3C respectively. Similarly, both the signal extraction circuitry 7D of transceiver 4D and the signal extraction circuitry 7E of transceiver 4E extract data from the same optical communication loop L3 for the GPS system 3D and the audio amplification speaker system 3E respectively.

Figure 3:
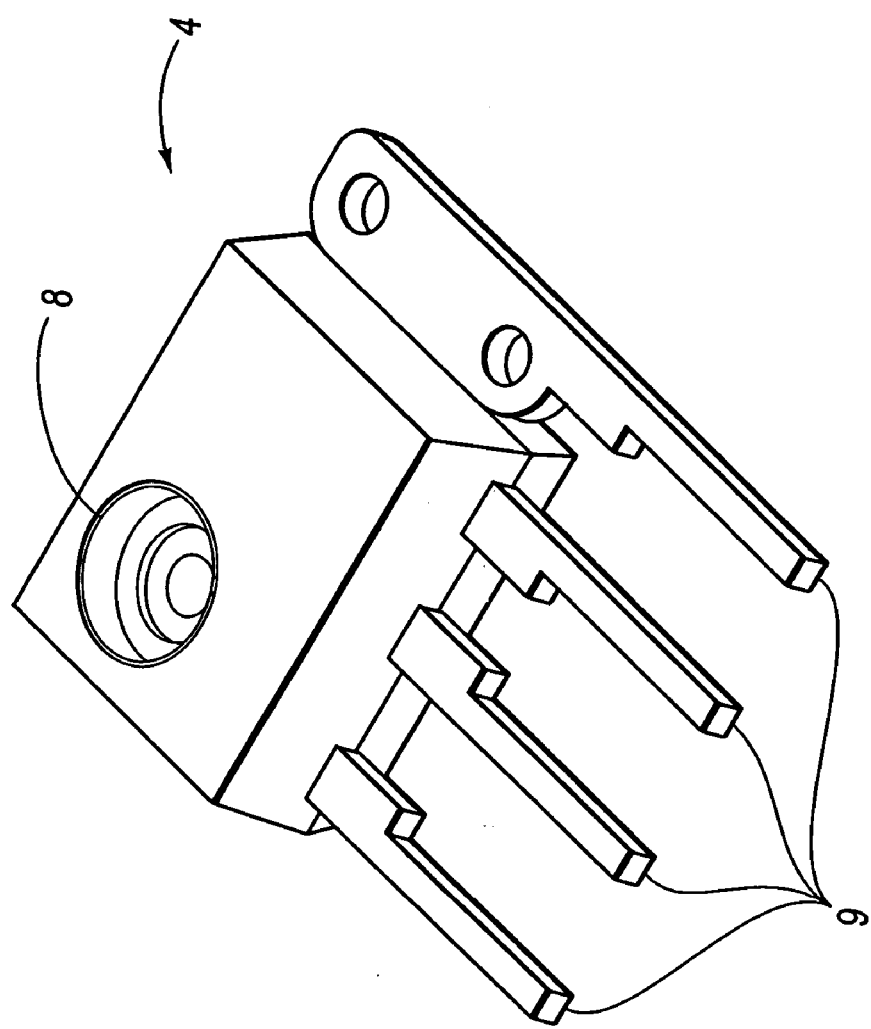
FIG. 3 is a perspective view of an example transceiver package according to an embodiment of present invention.

Referring now to FIG. 3 a perspective view of a transceiver package design 4 is shown according to an embodiment of the present invention is shown. The transceiver package 4 can include an opening 8 for receiving an optical fiber. The transceiver package 4 can further include several exposed electrical contacts 9 for programming the transceiver package 4, which will be discussed in further detail below.

Figure 4:
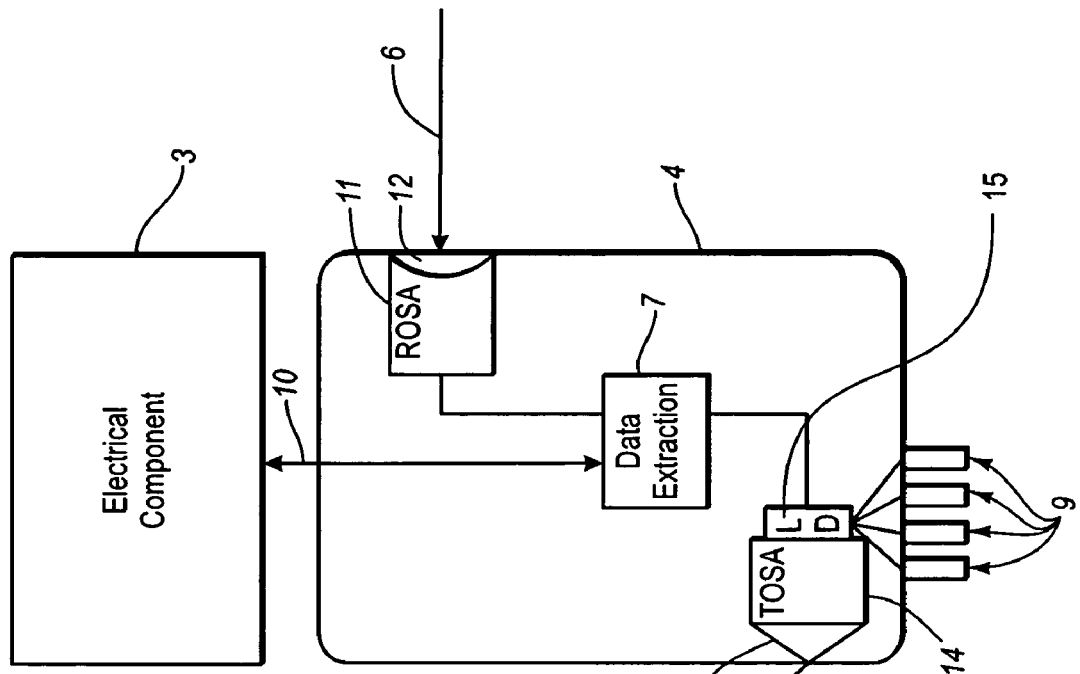
FIG. 4 illustrates a network of two transceivers according to an example embodiment of the present invention.
Figure 4:
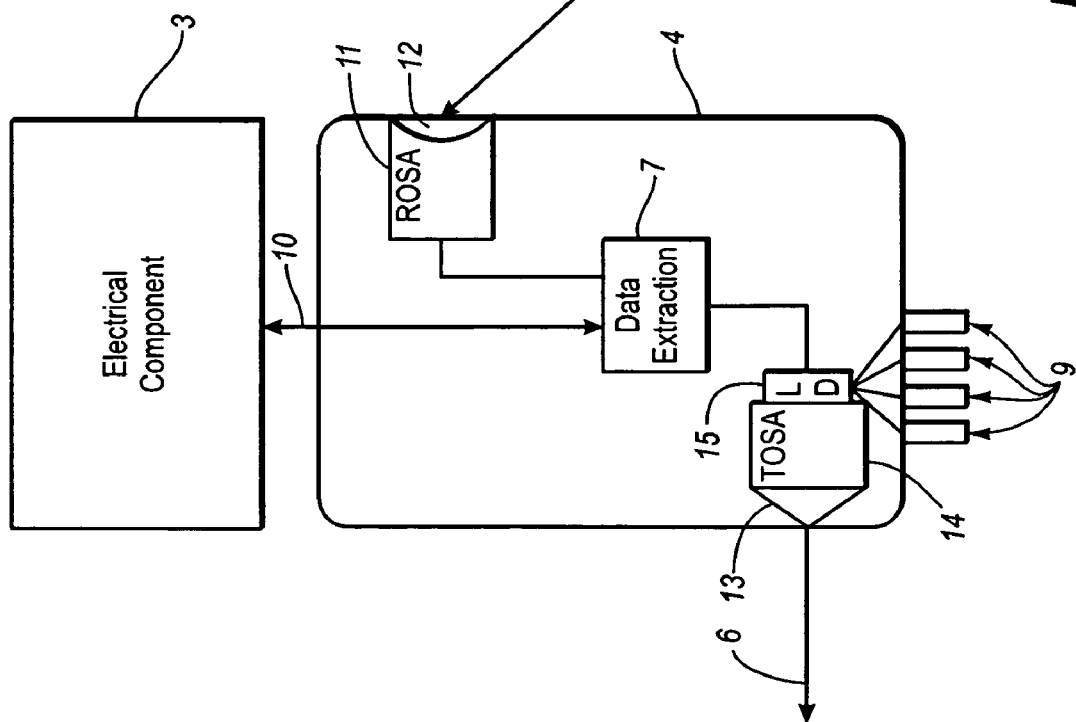

Referring now to FIG. 4, a network of two transceivers 4 is shown according to one example embodiment of the present invention. Each transceiver 4 is electrically coupled to an electronic device 3 for sending and receiving data. Each transceiver 4 includes a ROSA 11 having an opto-electronic transducer 12, such as a photodiode, for receiving an incoming optical signal from an optical fiber 6 having a silica based core and converting the optical signal into a corresponding electronic signal. Each transceiver 4 further includes a TOSA 14 having an electro-optical transducer, such as a VCSEL 13, for converting an electrical signal into an outgoing optical signal and transmitting the outgoing optical signal to an optical fiber 6 having a silica based core.

According to an embodiment of the present invention, each optical fiber 6 has a glass filament core with a functional bend radius of less than 5 centimeters and a diameter between about 50 micron and about 300 micron, preferably about 200 micron. According to an embodiment, each ROSA 11 includes a photodiode 12 having a diameter between about 100 micron and about 600 micron, preferably between about 300-350 micron. Each TOSA 14 can include a laser driver 15 and a VCSEL 13 configured to transmit an optical signal to the optical fiber. Each transceiver 4 further includes electrical contacts 9 coupled to the laser driver 15 for programming the laser driver 15 to provide a preferred drive current to the VCSEL 13 based on a characteristic of the VCSEL 13. According to an embodiment, each transceiver 4 can be externally programmable to compensate for temperature characteristics of the VCSEL 13 to stabilize the output of the VCSEL 13 at different temperatures.

Referring still to FIG. 4, as discussed above, each transceiver 4 can further include data extraction circuitry 7 for extracting data from the optical transmission network 2 that is meant for the electrical device 3 coupled to that particular transceiver 4. According to an embodiment of the present invention, the data intended for a specific electronic device 3 is transmitted along with information indicating the specific electronic device 3 that the data is intended for. For example, the data can be transmitted in the optical transmission network 2 in packets of data. Each packet can contain data intended for a specific electronic device 3. Each transceiver 4 examines the packet and decides whether it was intended for the electronic device 3 coupled to it. Each transceiver 4 can examine a tag, field, frame or the like within the packet of data to locate information designating an intended electronic device 3. Upon receiving a packet of data intended for the electronic device 3 coupled to the transceiver 4, the data extraction circuitry 7 of the transceiver 4 transmits the packet of data to the electronic device 3. Otherwise, where the packet of data is not intended for the electronic device 3 coupled to the particular transceiver 4, the transceiver 4 retransmits the packet of data to the next transceiver 4 in the optical communication network 2. Where data has been referred to as a packet of data, it should be understood that other terms can be used to define a discrete portion of data intended for a particular component, such as frame, block, cell, segment, signal, etc indicating a discrete portion of data intended for a particular electronic device 3.

Figure 5:
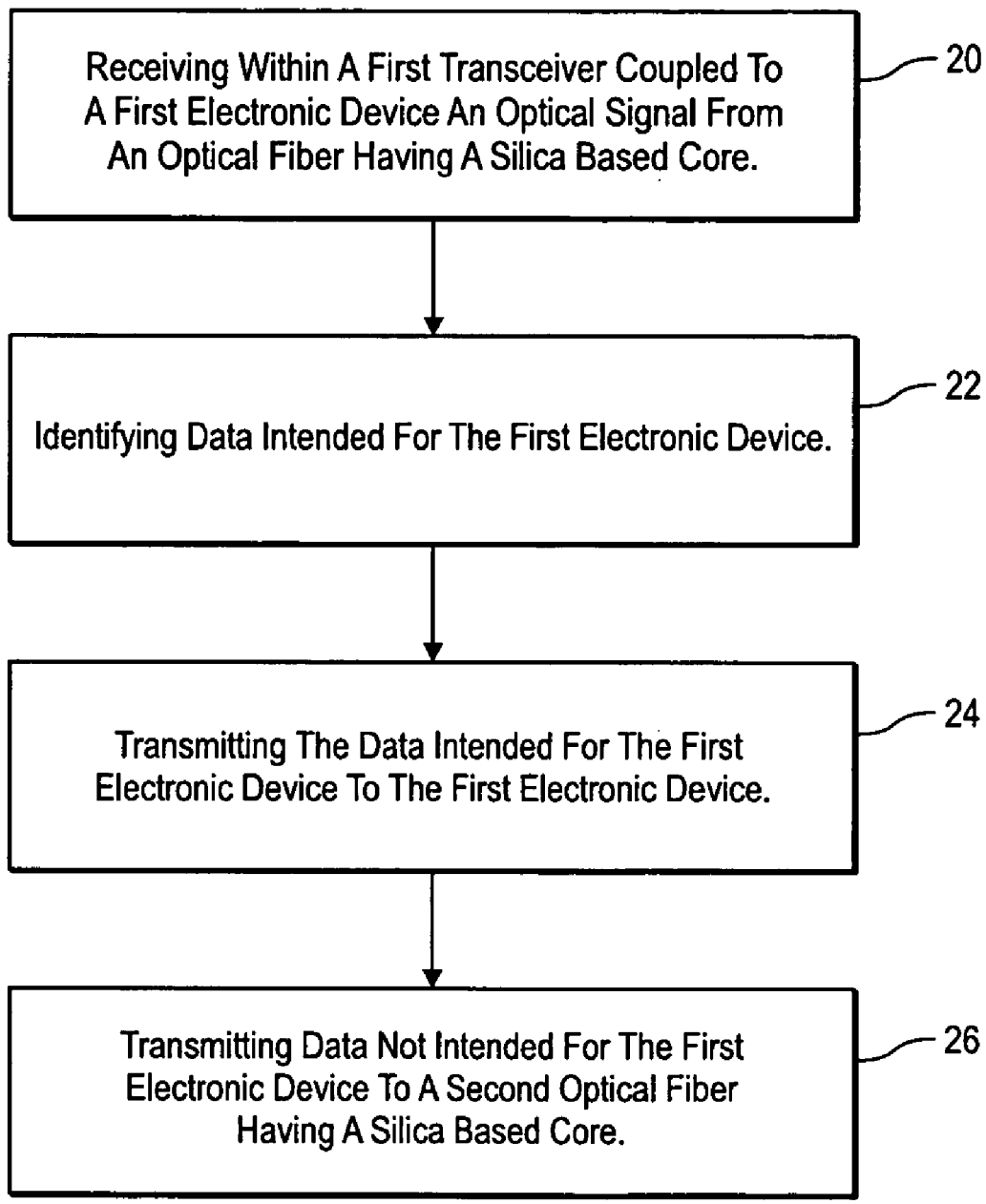
FIG. 5 is a block diagram illustrating one example of the steps associated with a method for transferring data between electronic devices coupled to a network within a vehicle.

Referring to FIG. 5, a block diagram illustrating a method for transferring data between electronic devices coupled to a network within a vehicle is shown according to an example embodiment of the present invention. The network can include a plurality of transceivers coupled to the electronic devices. A first transceiver coupled to a first electronic device can receive an optical signal from an optical fiber having a silica based core (20). Data intended for the first electronic device can be identified (22). The data intended for the first electronic device can be transmitted to the first electronic device (24). Data not intended for the first electronic device can be transmitted to a second optical fiber having a silica based core (26).

For example, referring again to FIG. 1, first transceiver 4A coupled to a first electronic device 3A can receive an optical signal from an optical fiber 6 having a silica based core. Data intended for the first electronic device 3A can be identified by first data extraction circuitry 7A. Data extraction circuitry can identify the data intended for the first electronic device 3A by an embedded code of field in the data as discussed above. The data intended for the first electronic device can be transmitted to the first electronic device by the first transceiver 4A. Data not intended for the first electronic device can be transmitted to a second optical fiber 6 having a silica based core.

A second transceiver 4B coupled to the second optical fiber 6 can receive the data not intended for the first electronic device 3A. The second transceiver 4B can identify data intended for the second electronic device 3B from the data not intended for the first electronic device 3A. For example, data extraction circuitry 7B can identify the data intended for the second electronic device 3B by an embedded code of field in the data not intended for the first electronic device 3A. The data intended for the second electronic device 3B can be transmitted to the second electronic device 3B. Data not intended for the first or second electronic devices 3A and 3B can be transmitted to a third optical fiber 6 having a silica based core. The data can be transferred between a plurality of transceivers 3 coupled in series within the vehicle 2 by a plurality of optical fibers 6 having silica based cores. The data not intended for the first electronic component 3A can be transmitted to the second optical fiber 6 having a silica based core by a laser, such as a VCSEL (e.g. laser 13 in FIG. 4). Each optical fiber 6 can be a polymer clad silica fiber with a diameter between about 50 micron and about 300 micron. The optical signal can be received by a photodiode (e.g. photodiode 12 in FIG. 4), which can have a diameter between about 100 micron and about 600 micron. The temperature of the VCSEL can be controlled using a programmable laser driver as described above. The electronic devices can be a personal computer, car security system, DVD player, CD player, video display, video camera, microphone, cellular phone, GPS system, or amplifier for an audio system, for example. Other devices and additional configurations can be included within the scope of the present invention.

The invention may be embodied in other specific forms without departing from its spirit or essential characteristics. The described example embodiments and specific features are to be considered in all respect only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver for transmitting data to an electronic device coupled to the transceiver, wherein the electronic device is an electrical device in a vehicle, the transceiver comprising:
   a receive optical subassembly comprising an opto-electronic transducer configured to receive an incoming optical signal from a first optical fiber having a silica based core;
   signal extraction circuitry configured to identify data intended for the electrical device coupled to the transceiver from the incoming optical signal and transmit the data that is intended for the electrical device to the electrical device located within the vehicle; and
   a transmit optical subassembly comprising a vertical cavity surface emitting laser (VCSEL) configured to transmit an outgoing optical signal to a second optical fiber having a silica based core.

2. A transceiver according to claim 1, further comprising:
   a programmable laser driver for providing a drive current to the VCSEL based on a temperature characteristic of the VCSEL.

3. A transceiver according to claim 1, wherein the first optical fiber has a diameter between about 50 microns and about 300 microns.

4. A transceiver according to claim 1,
   wherein the opto-electronic transducer is a photodiode having an active region with a diameter between about 300 and about 350 microns,
   wherein the photodiode is configured to receive an incoming optical signal from the first optical fiber having a diameter of about 200 microns; and
   wherein the VCSEL is configured to transmit an outgoing optical signal to the second optical fiber having a diameter of about 200 microns.

5. A transceiver according to claim 1, wherein the transceiver is a first transceiver and the electronic device is a first electronic device, and wherein the first transceiver is further configured to transmit data that is intended for a second electronic device coupled to a second transceiver to the second transceiver.

6. A transceiver according to claim 1, further comprising an interface for coupling the transceiver of claim 1 with the electronic device coupled to the transceiver within the vehicle.

7. A network comprising a plurality of transceivers according to claim 1, wherein the plurality of transceivers are coupled to a plurality of electronic devices within the vehicle, wherein each of the plurality of transceivers is coupled to another transceiver in a loop configuration by a plurality of optical fibers, wherein the optical fibers have a silica based core.

8. A fiber optic network for providing data communication between electronic devices in a vehicle, the network comprising:
   a first optical fiber having a silica based core for conducting an optical signal;
   a first transceiver for transmitting data to a first electronic device, the first transceiver comprising:
     a receive optical subassembly comprising an opto-electronic transducer optically coupled to the first optical fiber to receive the optical signal;
     signal extraction circuitry configured to receive the optical signal and extract a first data packet intended for the first electronic device;
     a transmit optical subassembly comprising a first vertical cavity surface emitting laser (VCSEL) configured to transmit at least a portion of the optical signal to a second optical fiber; and
     a programmable laser driver for controlling a drive current to the first VCSEL, wherein the laser driver is programmable to control the drive current supplied to the first VCSEL based on a temperature characteristic of the first VCSEL; and
   a second transceiver for providing data to a second electronic device, the second transceiver comprising:
     a receive optical subassembly comprising an opto-electronic transducer configured to receive at least a portion of the optical signal from the second optical fiber;
     signal extraction circuitry configured to receive the at least a portion of the optical signal and extract a second data packet intended for the second electronic device from the at least a portion of the optical signal;
     a transmit optical sub assembly comprising a second VCSEL configured to transmit at least a portion of the optical signal to a third optical fiber coupled to the transmit optical subassembly; and
     a programmable laser driver for controlling a drive current to the second VCSEL, wherein the laser driver is programmable to control the drive current supplied to the second VCSEL based on a temperature characteristic of the second VCSEL,
   wherein the signal extraction circuitry of the first transceiver is configured to extract the first data packet from the optical signal based on a data field in the first data packet, and wherein the signal extraction circuitry of the second transceiver is configured to extract the second data packet from the at least a portion of the optical signal based on a data field in the second data packet, wherein the data fields indicate an intended electronic device.

9. A fiber optic network according to claim 8, wherein each optical fiber comprises a glass filament core with a functional bend radius of less than 5 centimeters and a diameter between about 50 microns and about 300 microns.

10. A fiber optic network according to claim 8, wherein the first and second electronic devices are electronic devices selected from a group consisting of a personal computer, a car security system, a DVD player, a CD player, a video display, a video camera, a microphone, a cellular phone, a GPS system, and an amplifier for an audio system.

11. A vehicle comprising the network of claim 8.

12. A method for transferring data between electronic devices coupled to a network within a vehicle, the network comprising a plurality of transceivers coupled to the electronic devices, the method comprising the acts of:
   receiving within a first transceiver coupled to a first electronic device an optical signal from a polymer clad silica (PCS) fiber;
   identifying data intended for the first electronic device;
   transmitting the data intended for the first electronic device to the first electronic device; and
   transmitting data not intended for the first electronic device to a second PCS fiber.

13. A method according to claim 12, further comprising the acts of
   receiving within a second transceiver coupled to the second optical fiber having a silica based core the data not intended for the first electronic device;
   identifying data intended for the second electronic device;
   transmitting the data intended for the second electronic device to the second electronic device; and
   transmitting data not intended for the first or second electronic devices to a third optical fiber having a silica based core.

14. A method according to claim 13, wherein the electronic devices are electronic devices selected from the group consisting of a personal computer, a car security system, a DVD player, a CD player, a video display, a video camera, a microphone, a cellular phone, a GPS system, and an amplifier for an audio system.

15. A method according to claim 12, wherein the data is transferred between a plurality of transceivers coupled in series within the vehicle by a plurality of optical fibers having silica based cores.

16. A method according to claim 12, wherein the data not intended for the first electronic device is transmitted to the second optical fiber having a silica based core by a vertical cavity surface emitting laser (VCSEL).

17. A method according to claim 16, further comprising the act of:
   controlling the temperature of the VCSEL using a programmable laser driver.

18. A method according to claim 12, wherein each optical fiber is a polymer clad silica fiber with a diameter between about 50 microns and about 300 microns, and wherein the optical signal is received by a photodiode having a diameter between about 100 microns and about 600 microns.

* * * * *

UNITED STATES PATENT AND TRADEMARK OFFICE
CERTIFICATE OF CORRECTION

PATENT NO. : 7,643,756 B2  Page 1 of 1
APPLICATION NO. : 11/102290
DATED : January 5, 2010
INVENTOR(S) : Jose Joaquin Aizpuru It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1015 days.

Signed and Sealed this

Twenty-first Day of December, 2010

David J. Kappos
*Director of the United States Patent and Trademark Office*